US010248958B2

(12) United States Patent
Lindblom et al.

(10) Patent No.: US 10,248,958 B2
(45) Date of Patent: Apr. 2, 2019

(54) TECHNIQUES FOR INTEGRATING EXTERNAL CONTENT FROM ADVERTISING SERVICES INTO CLIENT APPLICATIONS

(75) Inventors: Eric Robert Lindblom, San Jose, CA (US); Scott A. Sachtjen, San Jose, CA (US)

(73) Assignee: Iconix, Inc., San Jose, CA (US)

( * ) Notice: Subject to any disclaimer, the term of this patent is extended or adjusted under 35 U.S.C. 154(b) by 341 days.

(21) Appl. No.: 12/905,225

(22) Filed: Oct. 15, 2010

(65) Prior Publication Data

US 2011/0093347 A1    Apr. 21, 2011

Related U.S. Application Data

(60) Provisional application No. 61/252,352, filed on Oct. 16, 2009.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0276* (2013.01)

(58) Field of Classification Search
USPC .......................................... 705/14.49, 14.53
See application file for complete search history.

(56) References Cited

U.S. PATENT DOCUMENTS

| 5,838,790 | A | * | 11/1998 | McAuliffe | G06Q 20/085 |
| | | | | | 713/176 |
| 6,199,106 | B1 | * | 3/2001 | Shaw | G06Q 10/107 |
| | | | | | 709/203 |
| 2005/0038861 | A1 | * | 2/2005 | Lynn | G06Q 10/107 |
| | | | | | 709/206 |
| 2006/0294258 | A1 | * | 12/2006 | Powers-Boyle | G06Q 30/02 |
| | | | | | 709/246 |
| 2009/0097662 | A1 | * | 4/2009 | Olechowski | G06F 21/554 |
| | | | | | 380/286 |

OTHER PUBLICATIONS

"Tips for Tracking Email Marketing Campaigns", by Google Analytics Solutions GoogleBlog, Mar. 17, 2009. pp. 1-5. (Year: 2009).*
Gabrielson, Erik, et al., "Is the open rate a useful e-mail metric?", DMNEWS, www.dmnews.com, (Sep. 15, 2008), p. 11.

* cited by examiner

*Primary Examiner* — William A Brandenburg
(74) *Attorney, Agent, or Firm* — Schwegman Lundberg & Woessner, P.A.

(57) ABSTRACT

Techniques for integrating advertising content into client applications are presented. Events occurring within client applications are monitored and when a predefined event is encountered and external advertising service is consulted for acquiring external content. The external content is then integrated into one or more portions of presentations associated with the client applications.

20 Claims, 8 Drawing Sheets

TECHNIQUES FOR INTEGRATING EXTERNAL CONTENT FROM ADVERTISING SERVICES INTO CLIENT APPLICATIONS

RELATED APPLICATIONS

This Application is a non-provisional filing of and claims priority to Provisional Application No. 61/252,352 filed Oct. 16, 2009 and entitled: "System and Method for Integrating other Digital Advertising Systems with Existing Web Based Advertising Networks;" the disclosure of which is incorporated by reference in its entirety herein.

TECHNICAL FIELD

The present invention relates to the computer communication. In particular, but not by way of limitation, the present invention discloses techniques for creating a unified digital advertising service that combines web site based advertising with other computer applications.

BACKGROUND

The global Internet has become a mass media on par with radio and television. As a mass media, it has become an invaluable tool for companies wishing to advertise to potential customers and directly communicate with existing customers.

The main method of Internet advertising is through the use of advertisement-sponsored web sites. Web sites have been created for virtually every topic of human interest. To support the web site hosting expenses and the creation of new web site content, many web sites include advertising on their web sites.

One of the simplest features of the global Internet, electronic mail, is also one of its most powerful tools. With electronic mail (email), a user of the Internet can send a message to any other user on the Internet. With the advent of HTML formatted email messages, email can now contain images and hyperlinks to other resources. Additional files, such as programs or data, can also be enclosed within email. Thus, even though email is one of the oldest Internet applications, it remains one of the most important.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to email applications, the teachings can be used with any other type of computer application. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
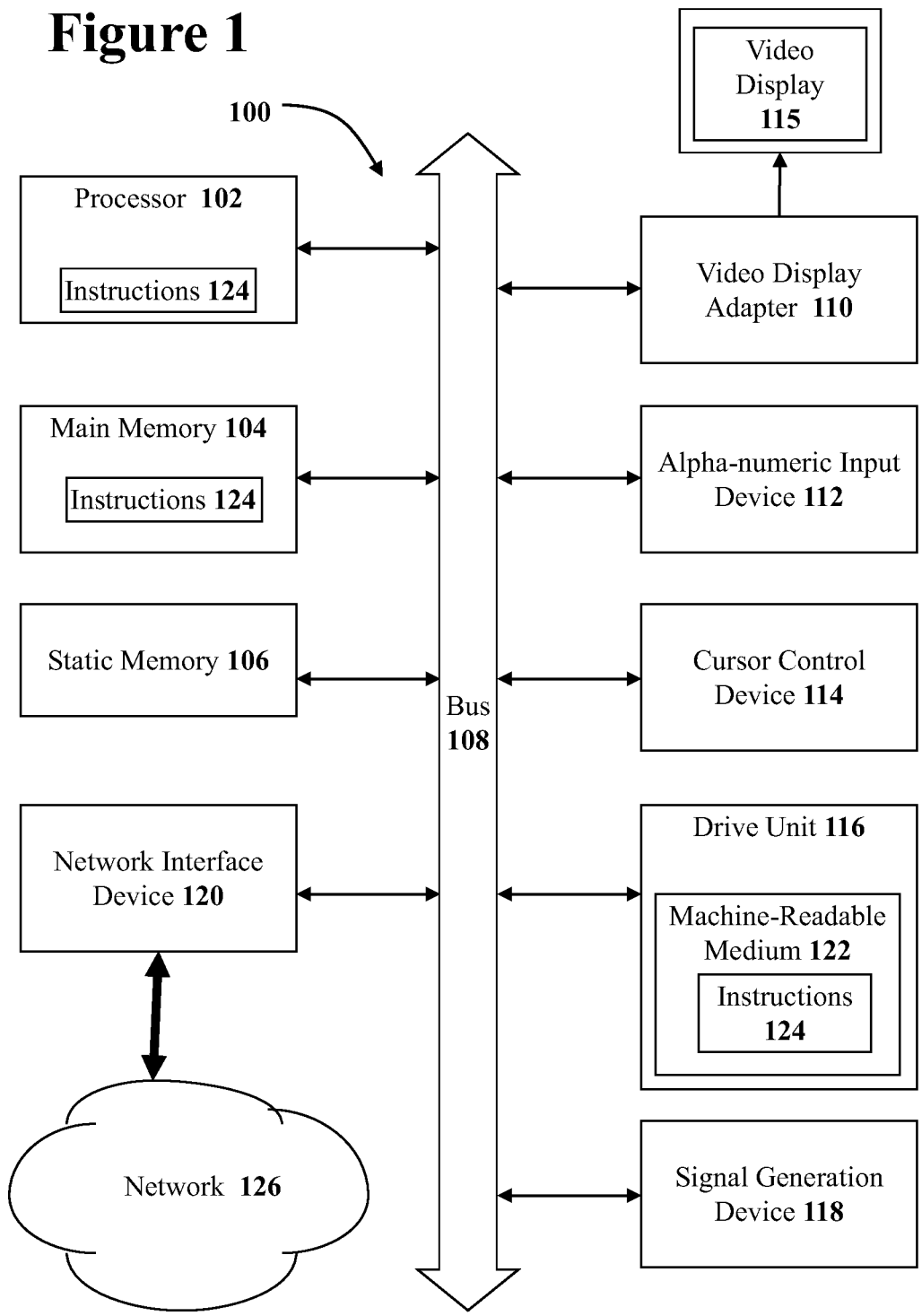
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server system or a client system in server-client network environment. Alternatively, a networked system may operate as a peer machine in a peer-to-peer (or distributed) network environment.

The machine may be a personal computer (PC) system, a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify a set of actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein.

The example machine consisting of computer system 100 illustrated in FIG. 1 includes a processor 102 (e.g., a central processing unit (CPU), a graphics processing unit (GPU) or both), a main memory 104, and a static memory 106, which may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse, trackball, touchpad, or other input device), a disk drive unit 116, a signal generation device 118 (e.g., a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104, the static memory 106, and/or within the processor 102 during execution thereof by the computer system 100. Thus, the main memory 104, the static memory 106, and the processor 102 may also constitute machine-readable media.

The instructions 124 for operating computer system 100 may be transmitted or received over a computer network 126 via the network interface device 120. Such a transmission of instructions may utilize any one of a number of well-known transfer protocols such as Hypertext Transport Protocol, File Transfer Protocol (FTP), or any other suitable data transfer protocol.

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any physical medium that is capable of storing, encoding, or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, and magnetic media.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

World Wide Web Advertising

Although individual personal computer systems are powerful tools on their own, the usefulness of personal computer systems is greatly enhanced when the personal computer systems are coupled together into computer networks. When personal computer systems are coupled together into computer networks, the personal computer systems can share network accessible resources such as printers, scanners, and network accessible storage space. More importantly, the users of the personal computer systems can share data such that users can easily exchange messages, documents, images, video, and other type of digital information.

Individual local computer networks have been coupled together with a common well-defined protocol known as TCP/IP in order to create a global interconnection of computer networks known as the Internet. With the global Internet, any Internet coupled computer system can communicate with any other Internet coupled computer system. Thousands of different digital communication applications have been created to take advantage of the interconnectivity offered by the global Internet.

One of the most well-known and popular Internet-based digital communication applications is the World Wide Web. The World Wide Web (WWW) is a collection of computer server systems, known as web servers, which serve rich multi-media web pages to WWW client programs that request the web pages. The web client programs are known as web browser programs and include, among many others, Microsoft's Internet Explorer, Apple Computer's Safari, and Mozilla's Firefox.

Due to its ease of use and rich feature set, the WWW has become a new mass media on par with radio and television that has spawned its own media industry. Web site publishers create interesting WWW content to attract web site visitors and then generate revenue by serving advertisements to web site visitors, charging the web site visitors a subscription fee, or using another business model. Virtually every major newspaper, magazine, and television station has created a web site on the WWW in order to participate in this relatively new media industry.

As with radio and television, a large portion of the commercial WWW is made up of advertising-supported web sites. These advertising-supported web sites provide interesting content in order to attract viewers and then charge advertisers' fees for serving web-based advertisements to the web viewers along with the interesting content created to attract the web site viewers.

Figure 2:
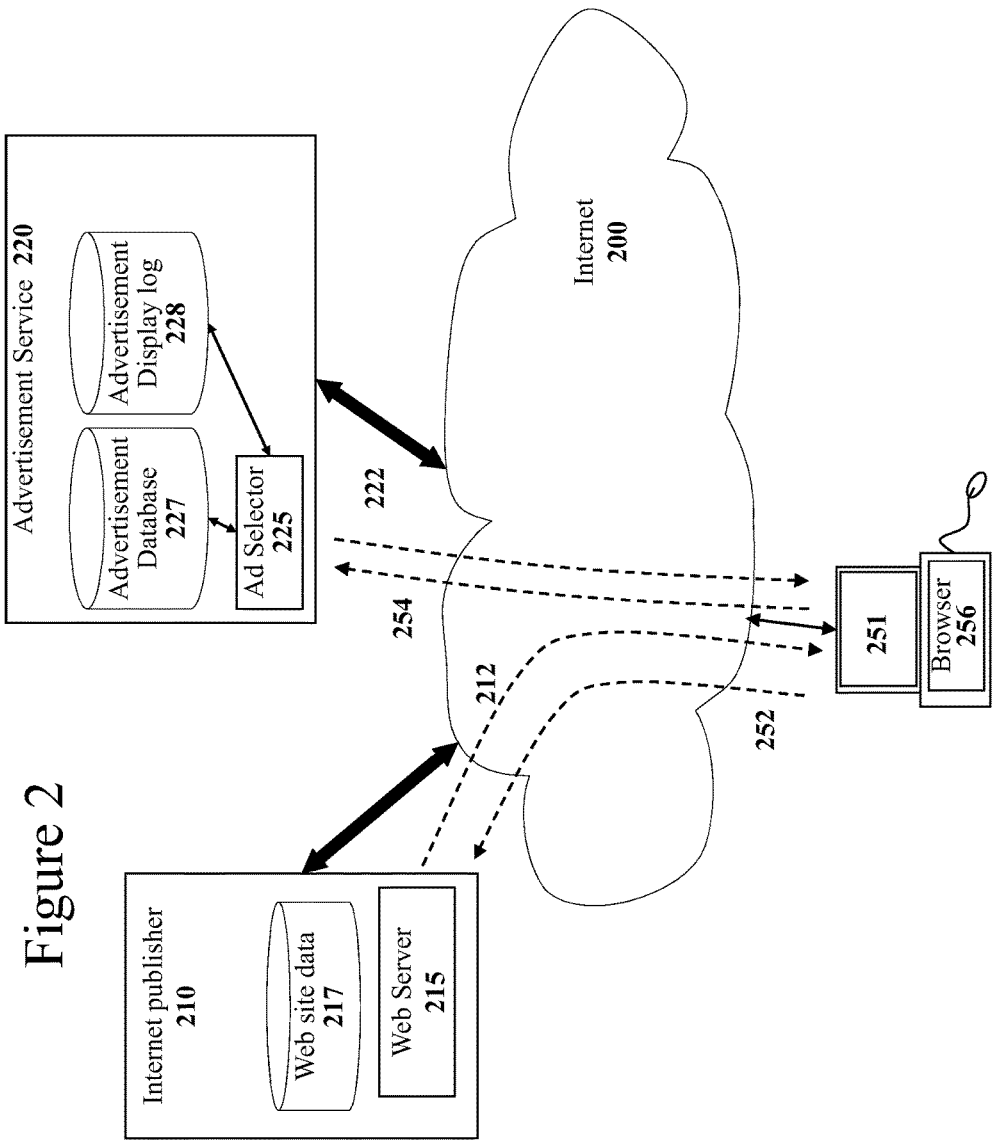
FIG. 2 illustrates data flow diagram that generally describes how web based Internet advertising works.

An Internet advertising service industry has grown up along with the new Internet media industry to service the advertising-supported Internet publishers. The Internet advertising service industry provides web-based advertisements to Internet publishers on-demand, tracks these advertisement requests, and provides payment to the Internet publishers for displaying the web-based advertisements to the Internet viewers. FIG. 2 illustrates a high-level flow diagram describing how the web-based advertising services provided by an Internet advertising service generally operate.

Referring to FIG. 2, a person at personal computer system 251 is illustrated accessing an advertising-supported web site created by Internet publisher 210. Specifically, when the personal computer system 251 accesses the web site of Internet publisher 210, the browser program 256 makes a request 252 (such as an HTTP "GET" request) to the web server 215 run by the Internet publisher 210. The web server 215 then returns a response 212 with the proper web page data request from the web site database 217. Within the web page data in the response 212, advertisements are interspersed within the web site content such that the web page viewer at personal computer system 251 is exposed to advertising that supports the Internet publisher 210.

With most advertising supported web sites, the advertisements within the web pages are actually links to externally provided advertisements. These links to advertisements generally refer to a third-party Internet advertisement service such as advertisement service 220. Thus, to completely render the web page on personal computer system 251, the browser program 256 uses the link to the advertisement to make an advertisement request 254 to the third-party advertisement service 220. The advertisement request 254 to the advertisement service 220 may include some contextual information about advertisement request. Specifically, the request may include information about the Internet publisher 210, some information known about the user at personal computer system 251, and information about the actual web page being delivered to the user at personal computer system 251. This advertisement request 254 is then handled by an advertisement selector 225 that may use the contextual information within the advertisement request 254 to select an appropriate advertisement from advertisement database 227 for display to the user at personal computer system 251.

The Internet advertisement selected by advertisement selector 225 is returned in advertisement response 222 to personal computer system 251 such that browser program 256 can display the selected advertisement to the person at personal computer system 251. In addition to providing the requested advertisement, the advertisement selector 225 also records that the advertisement was delivered to the user at personal computer system 251 on behalf of the web site of the Internet publisher 210 in advertisement activity log 228. Advertisement services can keep track of the different client computer systems that advertisements are served to by placing identifiers (commonly known as "cookies") on the client computer systems.

Internet Advertisement Result Tracking

As with any service that people pay for, the purchasers of advertising need to have some type of metric in order to gauge the effectiveness a particular advertising service. With newspaper and magazine advertising, the advertising purchasers can be told how many subscribers receive the newspaper or magazine on a subscription basis and how many copies are sold at newsstands. Similarly, broadcast ratings services, such as the Arbitron and Neilson services, are used to determine how many people listen to or view a particular advertising-supported radio or television show, respectively. Internet-based advertising services must be able to provide the same type of information such that advertisement purchasers know that the advertisements are actually reaching an intended audience.

Due to the nature of the computer network technology, Internet advertising services can actually provide much more and better information than broadcast advertising services. As set forth above with reference to FIG. 2, each and every display of an Internet advertisement to an end user may be logged by an advertisement service. A display of an Internet advertisement to an Internet user is commonly known as 'impression'.

However, the mere logging of each display of an Internet advertisement to an end user is just the beginning. With World-Wide-Web based Internet advertising, an Internet advertisement service may also keep track of every instance when a displayed Internet advertisement creates enough interest in an end user such that the Internet user interacts with the Internet advertisement. Specifically, all Internet advertisements may also include a link such that when a web viewer clicks on an Internet advertisement (selects the advertisement with a cursor control device such as a computer mouse and clicks on an activation button) that web viewer will then be directed to another web site designated by the Internet advertisement. At the designated web site, the web viewer may obtain more information about the product or service presented within the Internet advertisement. An example of such Internet advertisement click-tracking is illustrated in FIG. 3.

Figure 3:
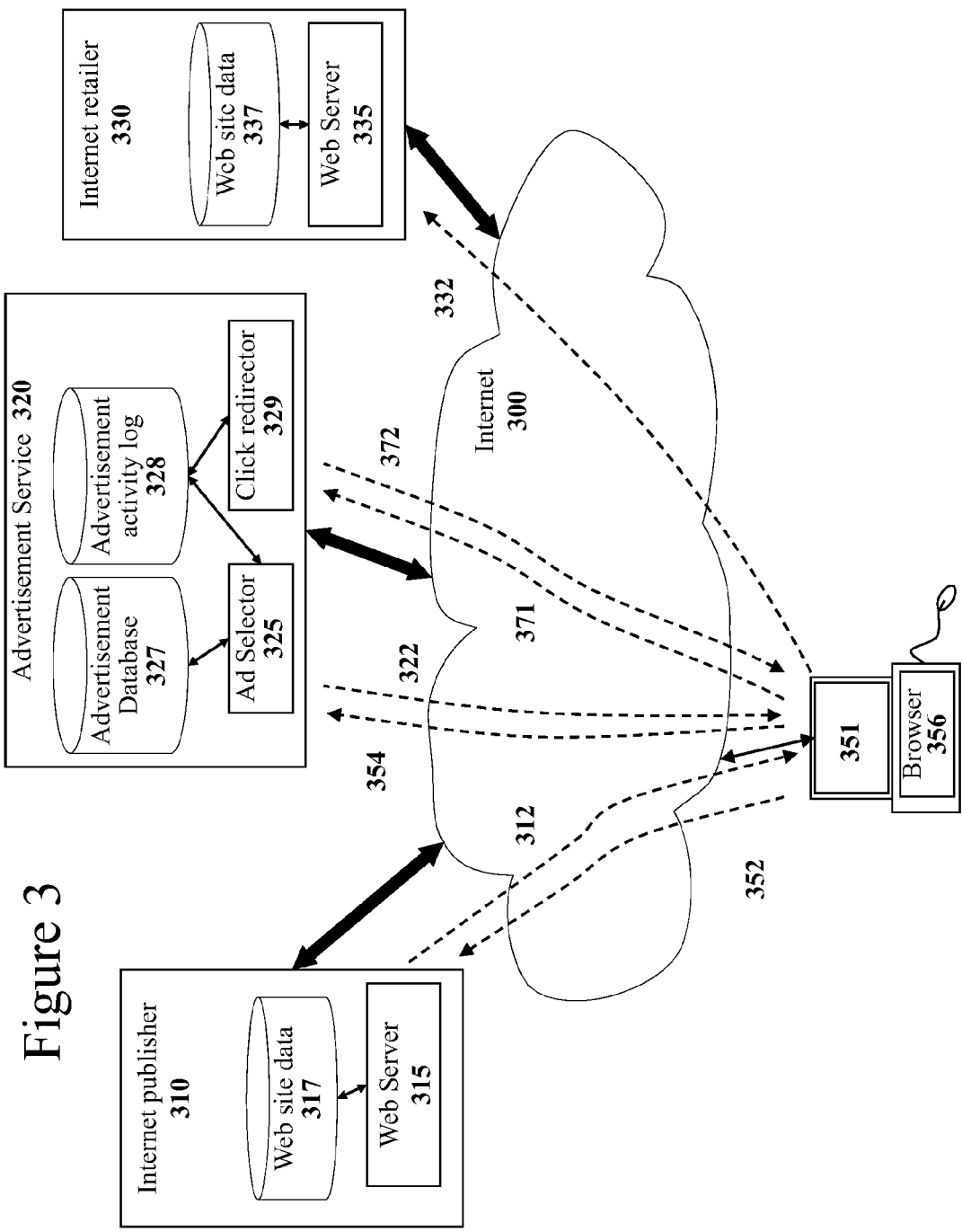
FIG. 3 illustrates data flow diagram that describes how an Internet advertising service can be used to measure the effectiveness of web based advertising by recording "click-throughs".

Referring to FIG. 3, a person at personal computer system 351 may be viewing a web site from Internet publisher 310 that includes externally sourced Internet advertisements served along path 322 from advertisement service 320 (in the same manner as set forth with reference to FIG. 2). The Internet advertisements from advertisement service 320 will be displayed on the personal computer system 351 with hyperlinks such that if the user at personal computer system 351 clicks on any of the displayed advertisements, the user will be directed to a new web site. Specifically, if the user clicks on an Internet advertisement then the browser program 356 will make a request 371 to the advertisement service 320 that may be directed to a click redirector 329.

The click redirector 329 will record the user's click into the advertisement activity log 328 (for billing purposes) and then send a response message 372 to personal computer system 351 that redirects the web browser program 356 to a web site that has been associated with the Internet advertisement that the user clicked on. In the example of FIG. 3, the response message 372 redirects the browser program 356 to the web site of an Internet-based retailer 330 mentioned in the Internet advertisement that the user clicked on. Thus, the browser program 356 will then make request 332 to the web server 335 of Internet-based retailer 330 and receive a designated web page from Internet-based retailer 330. The tracking of clicks on WWW advertisements is known as "click-through" tracking and has become an extremely important metric for measuring Internet advertisement effectiveness.

Internet Email Advertising and Marketing

Although the WWW gets most of the attention, simple electronic mail (email) is also an invaluable form of Internet-based advertising and marketing. Email has long been used by commercial entities for communicating with existing clients and prospective clients. For example, commercial entities send out periodic email messages to existing customers informing those customers of product upgrades, new products, and other information that the client may find useful. Commercial entities also frequently send email to prospective customers who have requested an email message by sending an email request or clicking on a web site link requesting additional information.

Email-based advertising and marketing is so useful and so efficient that it has become massively abused by advertisers that engage in mass emailing campaigns that send millions of unsolicited commercial email messages to users. Such unsolicited commercial email (UCE) messages are commonly known as "spam". An entire industry has been created to filter spam messages out of email traffic in order to reduce email traffic and not bother email recipients with unsolicited commercial offers. Although the unsolicited commercial email solicitations (spam) are generally frowned upon and often illegal, legitimate commercial email remains an excellent method of conveying information to existing customers and prospective customers that have requested information. With the advance of HTML formatted email, email messages can carry the same rich multi-media information as web pages (images, animations, etc.)

With email advertising and marketing, an entity that sends out email advertisements will know how many email advertising messages were sent out. However, that entity will not know how many of those messages were filtered out by spam filters at Internet service providers, filtered out by spam filters at destination mail servers, filtered out by email client programs, deleted by a user without opening the message, or otherwise discarded without leaving any significant impression upon the intended recipient. Thus, the effectiveness of obtaining advertising impressions upon users with email-based advertising is very difficult to measure.

In attempts of remedying this situation, many email based marketers and advertisers started embedding links to small (or transparent) images within HTML-formatted email advertisement messages. In this manner, when a user opened up and viewed the email advertisement message, the user's email client program would need to access the server that hosts the embedded image in order to render the email message. In this manner, the accessing of the embedded image notifies the sender of the email advertisement message that one of the email advertisement message recipients received the email advertisement message, opened the email advertisement message, and viewed the email advertisement message. Furthermore, if the email advertiser used unique addresses for the image links embedded in the email advertisement messages then that email advertiser would be able to detect exactly which recipient of the email advertisement message received and viewed the email advertisement message.

The technique of embedding image links into HTML-formatted messages does not work for users that only accept text-based email messages. And worse, the technique was quickly adopted by spammers that sent out large volumes of unsolicited commercial email messages as a means of determining which email addresses of randomly generated email addresses were associated with real email recipients. Thus, most email client programs will now no longer display linked images in their default settings. Thus, the embedded image link technique for determining when an email recipient has received and open an email message has become largely useless for determining if a user has received and opened an email message.

Figure 4:
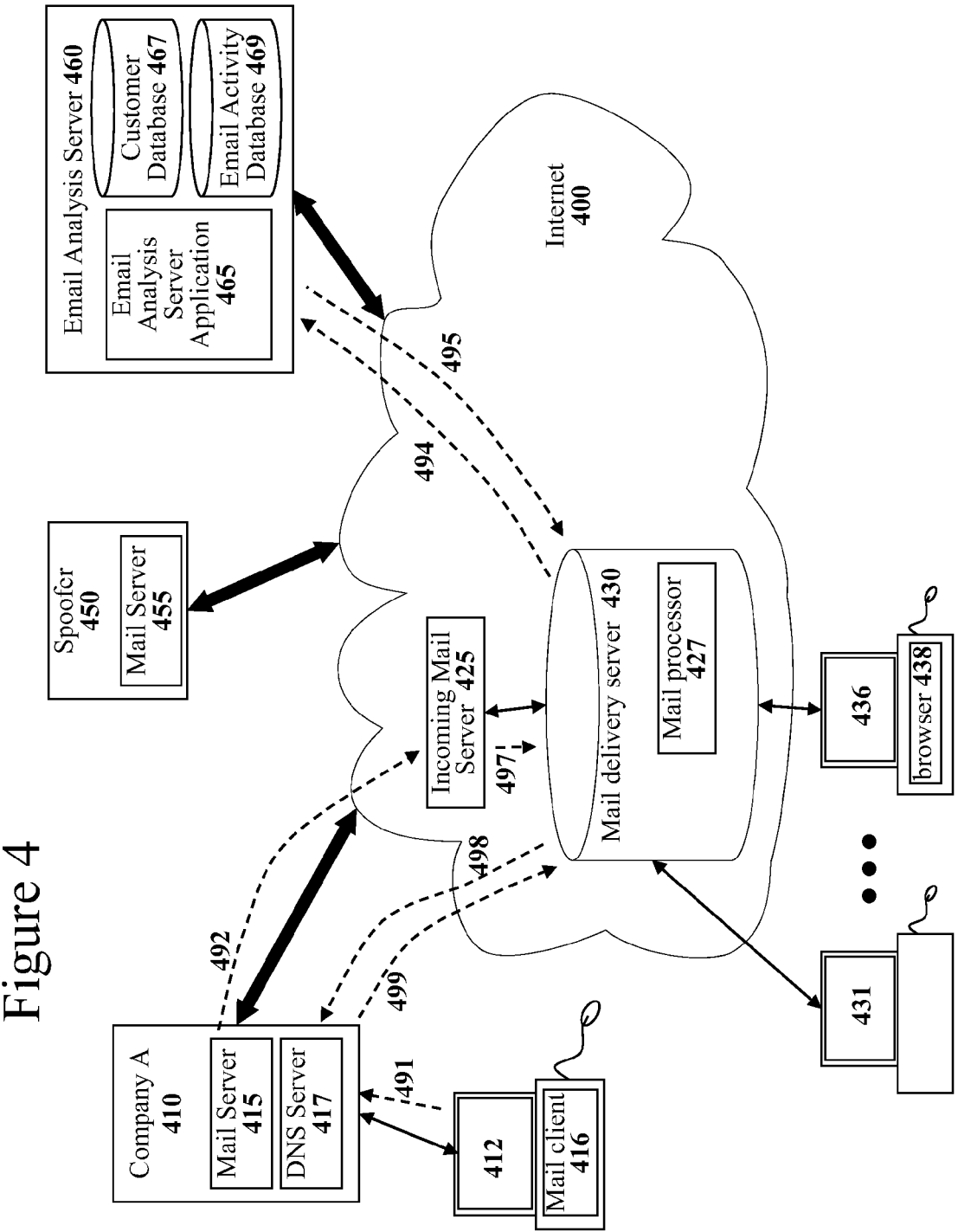
FIG. 4 illustrates a conceptual diagram that illustrates one method of how the receipt of an email message may be detected.

Iconix, Inc. of Santa Clara has developed various means of detecting when a user has received and/or viewed email messages that do not rely upon the display of an embedded image from an HTML-formatted email. FIG. 4 illustrated one exemplary embodiment of the email tracking system for web-based email systems. To describe the operation of the email tracking system, an example usage of the system will be disclosed following an email message from sender to recipient with reference to FIG. 4. In the embodiment of FIG. 4, a mail processor program 427 within a mail delivery server is used to perform the tracking of email messages; however the mail processing program may reside at other locations along the mail delivery chain, including the mail client or web browser.

Initially an email sender at computer system 412 uses a mail client program 416 to compose and send an email message addressed for delivery to an end user of computer system 436. Any type of email client program or other email sending program may be used. Ideally, the email sender will tag the email message with various tracking information but this is not necessary. The mail client program 416 passes the composed email message to the mail server 415 that has been assigned to handle out-going email messages for mail client program 416.

Mail server 415 then parses the standard email header information in the composed email message to determine where to send the email message. After parsing the Internet email headers to determine the email message's destination address, mail server 415 then delivers the email message along data path 492 to incoming mail server 425 that is designated to receive email for the intended email recipient at computer system 436. In the example of FIG. 4, computer system 436 uses a mail server provided by his local Internet Service Provider (ISP) such that incoming email server 425 is illustrated as part of the Internet from the perspective of computer system 436.

Incoming mail server 425 determines that the email message is addressed to an email user that is served by web-based mail delivery server 430 such that the email message passes along path 497 to the mail delivery server 430 where the email message waits until the email message recipient requests his email.

When the email recipient at computer system 436 requests his email, a mail processor 427 may then be used to process each email message. The request can be done automatically via and email client 416 at periodically intervals when pulled from an email server 430. Additionally, it is noted that the sequence can occur in a variety of manners, such as when the email arrives at the server 430. Mail processor 427 examines each email message to determine how to process that email message. Mail processor 427 may be integrated into the mail delivery server 430 software or it may be implemented as a separate mail filter (sometimes known as a "milter") program, or on the client 436 or in the browser of 436.

In one embodiment, the mail processor program 427 contacts an email analysis server application 465 along data path 494 with information about the email message and requesting advice on how the email message should be processed (or if the email message should be processed at all). The information about the email message may consist of information from the "From:" field, the "Return-Path:" field, and any other email field that provides useful information to identify the sender of the email message. As noted earlier, special tracking information may have been placed in the email message to aid in this mail identification and processing task. In some embodiments, the communication between mail processor program 427 and email analysis server application 465 (along data paths 494 and 495) is encrypted for privacy and security reasons.

Upon receiving a request as to how a particular email message should be processed, email analysis server application 465 may consult a customer database 467 to determine if the email message was sent by an entity that has requested that their email messages should be processed by recipients in a special manner. Note that at this point, the email analysis server application 465 has been informed that the email message is being delivered to its recipient such that email analysis server application 465 may note in the email activity database 469 that the email message was delivered successfully. After consulting the customer database 467, the email analysis server application 465 will generate a return message that informs the mail processor 427 how to process the email message. Note that the email analysis server application 465 may specify no specific special processing for most email messages and instead focus only upon those messages from entities listed in the customer database 467.

Email analysis server application 465 will provide its analysis to the mail processor 427 in a message sent along return data path 495 that contains any special information that specifies how the email message should be processed. In one embodiment, the message from email analysis server application 465 may specify that the email message should be authenticated and may specify how the email message should be authenticated by providing instructions that help the mail processor program 427 perform the authentication. Furthermore, the email analysis server application 465 may also provide special instructions and data that specify how the email message should be handled after email authentication. For example, an instruction may specify that messages that fail authentication be deleted or placed into a quarantine folder. The instructions and data from email analysis server application 465 may further include display directives that describe how the results of an email authentication should be presented on the email recipient's display screen. Display directives may include specific images (or pointers to such images) or text that should be displayed after final authentication decision.

Upon receiving the response message from the email analysis server application 465 along data path 495, the mail processor program 427 will use the information in that message to process the email message. For example, if the email message includes the Domain Keys Identified Mail (DKIM) signature system for email authentication as set forth in Internet RFC 4871 then mail processor program 427 may perform the steps necessary to authenticate DKIM email messages. Specifically, mail processor program 427 may contact the sender's domain name server (DNS) 417 along data path 498 to obtain key information for that domain. Mail processor program 427 will receive the public key associated with the domain of the sender along path 499 and attempt to decrypt the DKIM signature on the message. Note that many other different types of email authentication may also be used.

With the DKIM authentication system, if the cryptographic signature decrypts properly (as will occur with an authentic email message from Company A containing a proper cryptographic signature from Company A's domain) then mail processor program 427 may mark the email message as authentic. If the cryptographic signature does not decrypt properly or there is no cryptographic signature (as may be the case for an email message send from a malicious user such as spoofer 450 that is attempting to send forged email messages that purport to come from another entity), then mail processor program 427 may perform an action that was specified to be performed upon authentic failure in the message from email analysis server application 465. After completing its processing of the email message, the mail processor program 427 may then allow web-based mail delivery server 430 to display the email message on the browser 438 running on the recipient's computer system 436.

In the embodiment of FIG. 4, the mail processor program 427 resides within a web based email delivery server 430 such that any access from an email client (such as web browser 438 in computer system 436) to an email message in email delivery server 430 can be tracked and reported to email analysis server application 465. Thus, mail processor program 427 may inform email analysis server application 465 when a user sees an email message in a list view, views an email message, forwards an email message, deletes an email message, or performs any other action on an email message. Other embodiments allow the processing to be performed at other stages along the email delivery chain.

Integrating Email Advertising with Existing Internet Advertising Systems

The email tracking system disclosed with reference to FIG. 4 allows an advertiser or marketer to track the receipt and viewing of email messages. Although useful, such isolated information is of limited utility to an entity that wishes to know much more about its customers and potential customers. To better understand how an email marketing or advertising message affects a particular user, it would be very desirable to have the email message tracking information within a context with other advertising information presented to that particular user. To achieve this highly desirable goal, the present invention proposed integrating an email tracking system with other advertising systems such that the email tracking data can be viewed in the context of these other advertising systems. In particular, it would be very desirable to integrate an email message tracking system with electronic advertising campaigns such as advertisements on the WWW.

Figure 5:
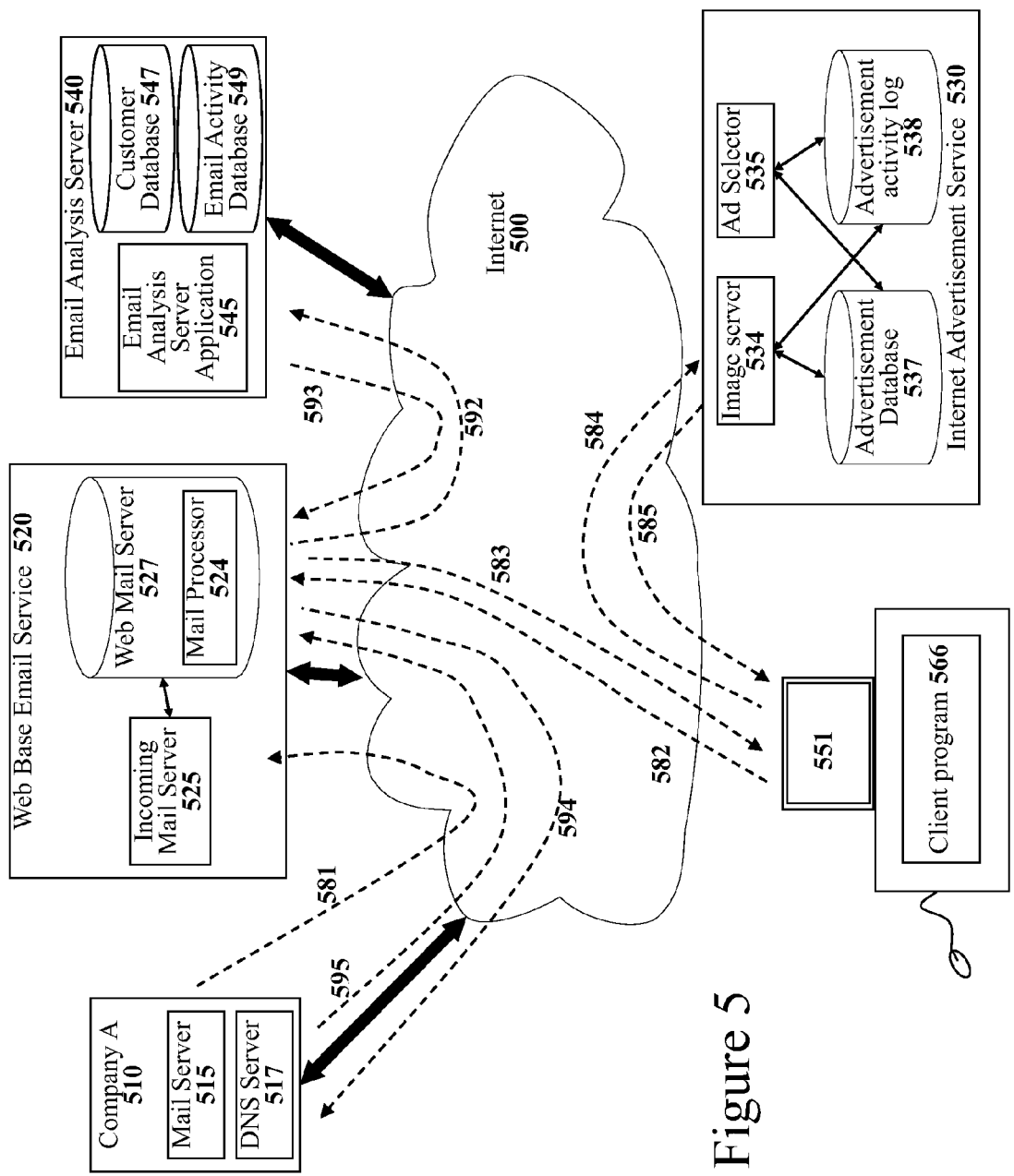
FIG. 5 illustrates a data flow diagram showing how the tracking of receipt and viewing of electronic messages displayed with a web browser can be integrated with Internet advertisement tracking systems.

FIG. 5 illustrates an embodiment wherein the email tracking system of FIG. 4 is integrated with an existing Internet advertising service. Referring to FIG. 5, Company A 510 may send an email message from its mail server 515 along path 581 to the incoming email server 525 that handles email for the user of computer system 551. Incoming email server 525 will pass the email message to a web mail server 527 that handles email deliveries for the user of computer system 551.

When the user of computer system 551 uses her client program 566 for accessing email, that client program 566 will access the mail server 527 along data path 582 to check for mail. In the embodiment of FIG. 5 a web browser is client program 566 that accesses a web based mail server, such as mail server 527. However other embodiments may use different client programs and mail servers. The mail retrieval request from client program 566 may set off a chain of events as forth below.

As with the system of FIG. 4, a mail processor 524 may make a request to an email analysis server application 545 to determine how a particular email message should be processed. The email analysis server application 545 will consult its customer database 547 to determine how each email message should be processed. At this point, the email analysis server application 545 may also note that the email message had been requested by the recipient in the email activity database 549. The email analysis server application 545 will return processing instructions in a message back to the mail processor 524 along data path 593.

A set of instructions and data from email analysis server application 545 may instruct mail processor 524 to authenticate the email message in order to determine if the email message was actually sent by the sender listed in the "From:" field of the email message or from the "purported responsible authority". In one embodiment this may be performed by retrieving a public key from a DNS server run by the domain of the purported email sender and verifying a digital signature on the email message. (This is the DKIM authentication system.) To perform the DKIM authentication, mail processor 524 will send a request along path 594 to DNS Server 517 and receive a public key in a response message received along path 595. Note that this is just one possible method of authenticating an email message and other authentication methods may be used. Furthermore, no authentication need be performed at all.

If the received email message is authenticated properly, the mail processor 524 may instruct the web mail server 527 to display a logo adjacent to the email message in a list of email messages displayed to the user at computer system 551. For example, a check-mark image signifying that email message has been checked for authenticity may be displayed next to the email message. In another embodiment, an actual trademark logo associated with the entity that sent the email message, Company A in this example, may be displayed adjacent to the authenticated email message from Company A.

The preceding example has been disclosed with reference to mail processing consisting of the authentication of email messages. However, this is only one possible reason of many for accessing the Internet advertisement service in conjunction with an email message. Other methods may include the display of special avatars or other information associated with certain email message senders.

The display of an image (or other data item) provides an opportunity to integrate information about delivered email messages to an Internet advertising service. Specifically, the mail processor 524 may instruct the web mail server 527 to display this check-mark image or trademark logo of Company A from an image server 534 hosted by an Internet advertisement service 530. Thus, email client program 566 will send an image request along path 584 to the image server 534 on Internet advertisement service 530 to obtain the check-mark image or trademark logo of Company A. Image server 534 on the Internet advertisement service 530 will then respond with the requested check-mark image or trademark logo of Company A in a response message along path 585. (This check-mark image or trademark logo of Company A may be stored in advertisement database 537 or elsewhere by unified Internet advertisement service 530.) After serving the check-mark image or trademark logo of Company A, the image server 534 will note in the advertisement activity log 538 that the check-mark image or trademark logo of Company A had been served to computer system 551. This serving of the check-mark image or trademark logo of Company A confirms that the email recipient received the email message and saw an advertising impression.

If the email message had been tagged with a unique identifier tag, then the mail processor 524 may use that unique identifier tag, or Campaign ID as part of the Internet Protocol (IP) address (e.g., may be used as a link via a Uniform Resource Locator—URL); the address used to obtain the image from within image server 534. In this manner, the image server 534 of Internet advertising service 530 could identify in the advertisement activity log 538 exactly which particular email message of many advertising email messages sent out was received. Similarly, the email analysis server application 545 may provide a unique identifier to the mail processor 524 such that the mail processor 524 could use that unique identifier to create an address (build the URL) of an image hosted by Internet advertising service 530. Note that all the different image addresses created by using unique identifiers in the image address can be mapped to the same image. For example, image server 534 may respond to all image requests by looking within a particular directory folder for the image being requested. In such an embodiment, the actual file name in a directory path is not used to identify a particular image but the actual file name is instead used as a mechanism for passing information to the image server 534 hosted by Internet advertising service 530.

Even if no unique tagging of individual advertising email messages is performed, the Internet advertising service 530 may still be able to use other means in order to associate a particular received advertising email message with other advertisements presented to that same computer system. When a WWW server such as image server 534 serves an image to client computer such as computer system 551, that image server 534 will read an identifier from a cookie stored on computer system 551 to identify that computer system. That identifier retrieved from computer system 551 can be used to look up every other advertising image served to computer system 551 by Internet advertisement service 530. Thus, the procedure of reading a cookie when computer system 551 an image associated with the display of a known email message can be used to associate the email message display along with other advertisements displayed on the same computer system 551. If no cookie yet resides on computer system 551, then a cookie will be placed such that subsequent advertisements can be associated with a received email message.

In the preceding example, the check-mark image or trademark logo of Company A was displayed during a list view of email messages (a view listing all the most recent email messages received by the user). The same procedure can be used again when the user performs any additional activities on the same email message. The mail processor 524 will use slightly different encodings of image addresses to identify the specify activity being performed on the email message. For example, if the user selects the email message for display to the user, the email client program 566 (a web browser in this example) will send another request to the web mail server 527 that will invoke mail processor 524. It is also noted that mail processor 524 can reside within client program 566, in some embodiments; in such embodiments, there may be no communication just the action by the user on the email message and then the reporting of the ad impression in the opened email message. Mail processor 524 will specify a specific image address to use in the subsequent web display of the email message on computer system 551. Thus, when client program 566 issues a request along path 584 to the image server 534 on Internet advertisement service 530 to obtain another image to construct a display with the opened email message. Image server 534 will respond with the requested image in another response message along path 585 and then record in the advertisement activity log 538 that particular image associated with the message display has been served to the user at computer system 551. In this manner, receipt, viewing, deletion or any other activity associated with a known email message may be tracked by the Internet advertisement service 530.

Figure 6:
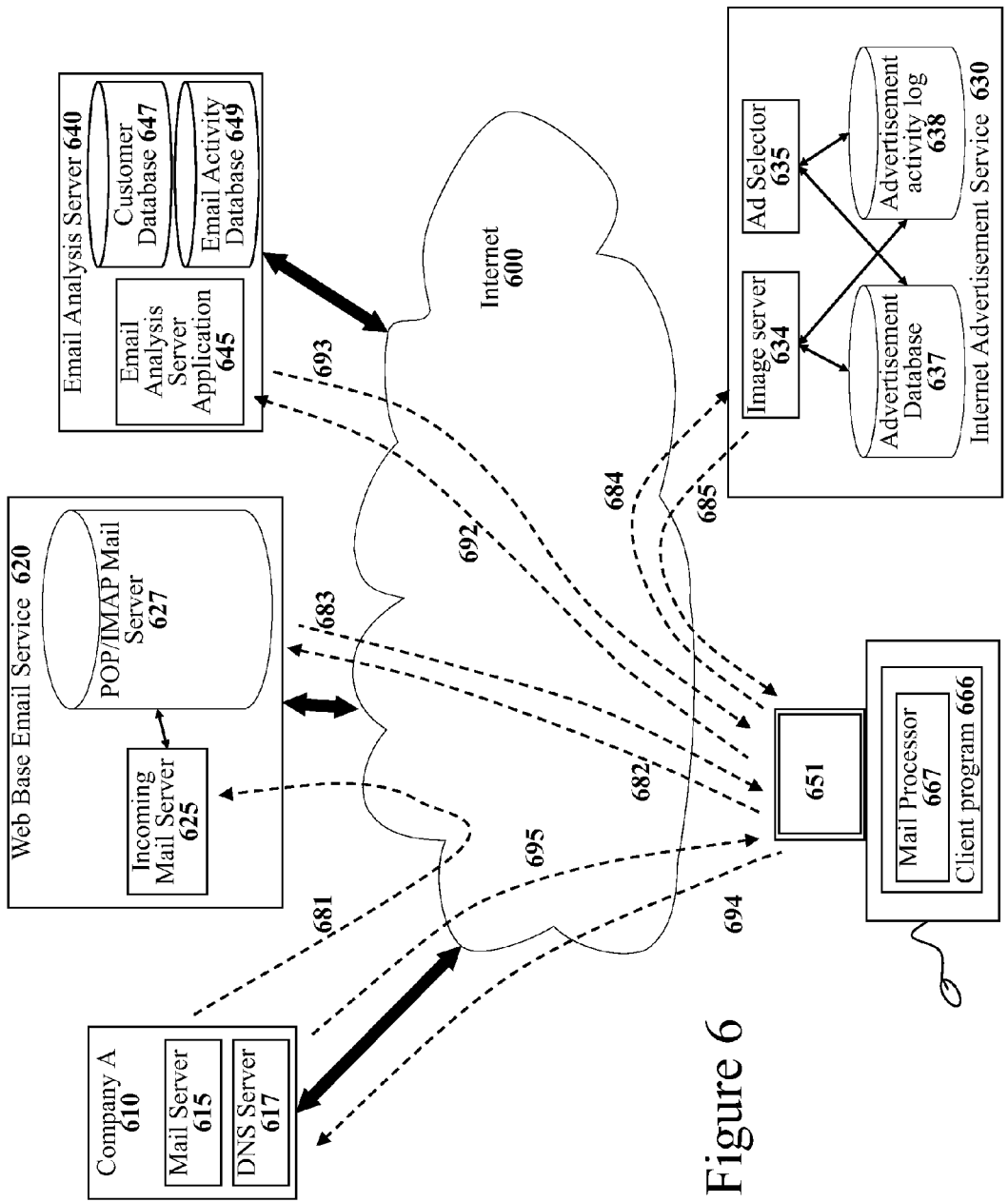
FIG. 6 illustrates a data flow diagram showing how the tracking of receipt and viewing of electronic messages with a mail client program can be integrated with Internet advertisement tracking systems.

FIG. 6 illustrates an alternative embodiment wherein special processing on an email message is performed by a mail processor routine 667 in a mail client program 666 on the end-user's computer system 651. In the embodiment of FIG. 6, an email message destined for computer system 651 is sent to the incoming mail server 625 designated to receive email for the user of computer system 651. That incoming mail server 625 then passes the message to a mail delivery server 627 that waits for the user of computer system 651 to request his email. Mail delivery server 627 may be a POP server, an IMAP server, a MAPI server, or any other type of mail delivery server. When computer system 651 requests mail along message path 682, mail delivery server 627 will respond with the user's email messages along 683. Upon receiving email, the mail processor 667 associated with the mail client program 666 will begin processing email. The email message processing may include authentication but may also involve other processing tasks.

To help process the email messages, mail processor 667 may request help from email analysis server application 645 with a message along path 692. As before, email analysis server application 645 will respond along data path 693 providing instructions and data to help mail processor 667 process the email message. The instructions and data may include references to images or other data provided by Internet advertisement service 630 which the mail processor 667 must reference.

Mail processor will then reference the images or other data provided by the Internet advertisement service 630 using the request along with data path 684. When Internet advertisement service 630 receives that request, the Internet advertisement service 630 will make a record in the advertisement activity log 638. Note that the request along data path 684 from mail processor routine 667 may include unique identification information retrieved from the email message header or provided by email analysis server application 645 such that Internet advertisement service 630 will be able to identify exactly which email message was processed by mail processor 667.

In one particular embodiment, no access to any email analysis server application such as email analysis server application 645 is required. To implement such an embodiment, the email message should be encoded with specific information in the email headers when the email message is sent. Ideally, this information will include a unique identifier for the email message but this is not necessary. Then, when the mail processor routine 667 receives the email message, the mail processor routine 667 will use that specific information to issue a request to a server at the Internet advertisement service 630. The request may be for an image or other data. The server at the Internet advertisement service 630 will use the request from mail processor routine 667 to indicate in advertising activity log 638 that the email message has been received. If unique identification information was placed in the email headers, the mail processor routine 667 may use that unique identifier information to create a request for a server at the Internet advertisement service 630 that identifies exactly which email message was processed.

As illustrated with reference to FIG. 5, the tracking of both web-based advertising and email based advertising may be performed by a single entity. This single entity may be referred to as a unified Internet advertising service.

It is noted that the architecture layout of the components and techniques presented herein can occur in a variety of manners and locations throughout a network. For example, the techniques for processing the messages can occur via a browser plug-in, via a native integrated web mail client, via a native email client application (such as but not limited to Outlook®, GroupWise®, etc.), via a native feature that is integrated into a browser, and the like.

Figure 7:
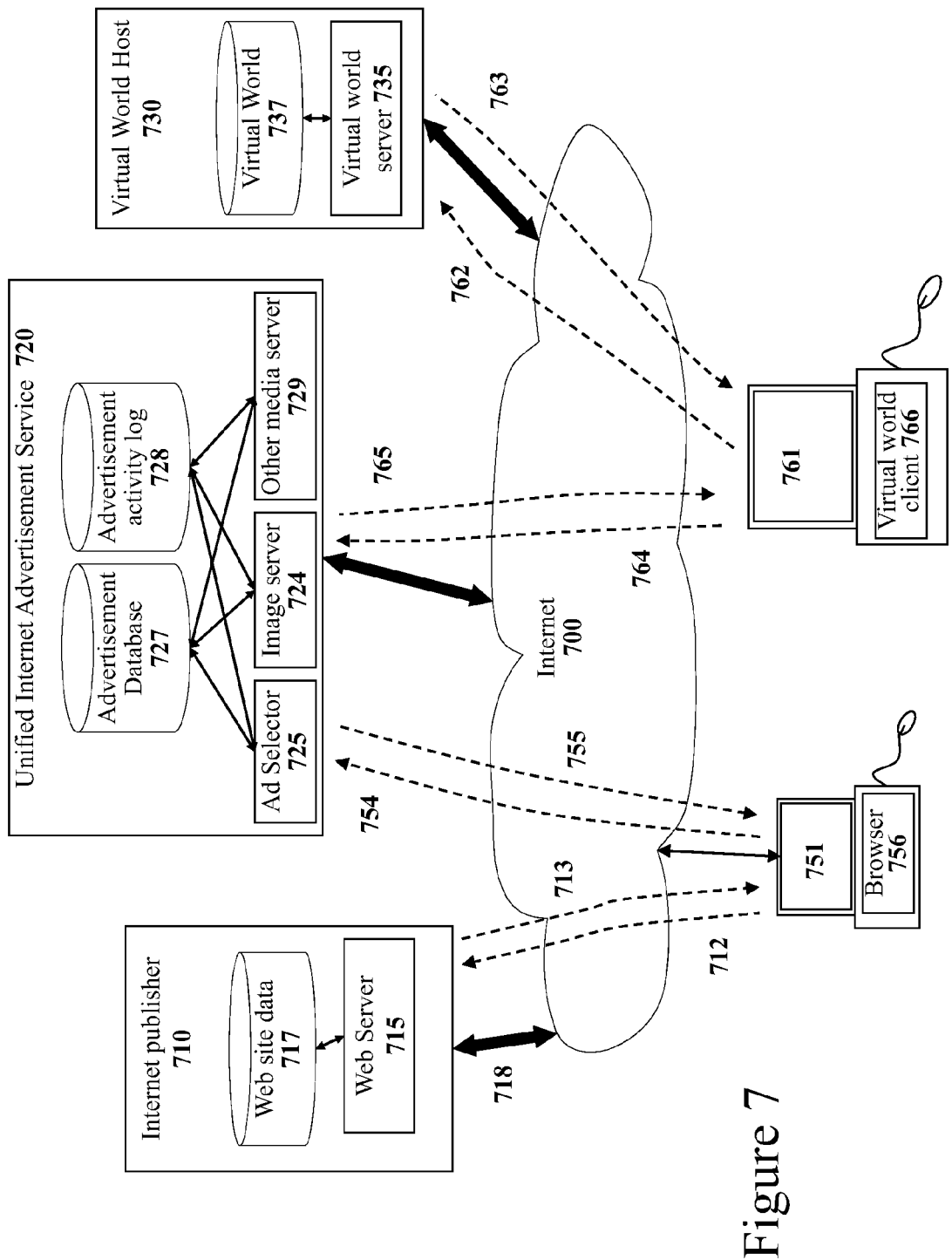
FIG. 7 illustrates how a unified Internet advertising service can be created to work with web advertising, virtual world advertising, and any other Internet advertising system.

In another embodiment of FIG. 7, a user places the cursor or mouse over the icon/image or logo of a message appearing within an email list view of an email client; email message preview; or message open, and an email certificate is created. The email certificate can contain information about the sender, and the certificate can also be combined with the ad service's image server. In this case the ad server provides the mail processor with an advertisement or coupon for placement within the email certificate. That coupon or advertisement may be further refined or directed by including unique IDs, such as the campaign ID, or cookies to the ad service when the request for the advertisement or coupon is made. As an example, Company A sends a reminder email to a customer informing him/her that some consumable product is about to be required for continued support, such as ink cartridges for a printer. The email arrives at the inbox and is processed; the mail service obtains Company A logo and places it in the email list view. The user can mouse over the Company A logo and the email certificate will contain a coupon for replacement product.

So, when focus of is placed over an icon image appearing next to a listing for an email message within an email client and with respect to a display interfaced to a processing device (phone, personal digital assistant, computer, etc.), a popup view is displayed having a certificate of the sender to provide a form of authenticity to the email message. In addition, the popup view can include some summary or portion of the body of the email message, such as a coupon. The popup view can include directional arrows to provide additional pages to the popup window and/or may include links that the user can activate. The popup window may even include operations such as "print the coupon" and the like. The amount of information included within the popup can be customized so as to not clutter the view unnecessarily and detract from the value of having condensed information in the popup window. In some cases, information in the popup window may not even appear in the body or the email message. For example partners to an enterprise that sent the email message may include their advertisements within the popup window. This popup window is entirely customizable by an enterprise.

Additional Internet Advertising Tracking

Although the WWW and email are two of the most well known means of advertising on the Internet, there are many other avenues for advertising on the Internet. For example, many useful application programs that display advertisements to the user when used may be distributed to users for free. When users of such applications run the application, the application will display an advertisement to the user. Similarly, the inhabitants of a virtual world (such as Second Life) or the players in a massive online game may be presented with advertisements within the virtual world.

To be useful, such alternate venues of Internet advertising should also be tracked. Thus, the providers of such advertising supported application programs should track when such programs display advertisements. Similarly, the online services that host virtual worlds or online games should track when such online services display advertisements to their users. In this manner, these alternate venues of Internet advertising can be compensated for their advertising services.

Having each individual Internet advertising venue track its own advertising displays allows those individual Internet advertising venues to track their advertising in order to charge for their advertising services. However, as noted earlier, such isolated advertisement tracking does not provide much useful information on the effectiveness of an overall advertising campaign that may use many different avenues for advertising. To provide better advertisement effectiveness tracking, the proposed unified advertising service system may be used to track advertisements with any other type of Internet application. The unified advertising service would be a centralized advertising service that would provide advertisements to many different types of applications that display advertisements. In addition to serving advertisements, the unified advertising service may also collect other user activity information that many be of value.

FIG. 7 illustrates a block diagram of a unified advertisement service 720 being used on the Internet 700. (Note that although the Internet is illustrated in the example of FIG. 7, any public or private data communication network may be used.) The unified Internet advertisement service 720 is used to support multiple different types of client programs. In the example of FIG. 7, two different client programs are being supported: a web browser client 756 and a virtual world client 766. However, many additional client programs such as cell phone applications, voice over IP applications, video conferencing applications, streaming radio applications, and streaming video applications may be supported as well.

The web browser client 756 may be handled in the traditional manner as previously set forth. Specifically, when web browser client 756 makes a request 712 to Internet publisher 710, the corresponding web page response 714 will include links to Internet advertisements. The web browser client 756 will then following the links with request 754 to the ad selector 725 of unified Internet advertisement service 720 in order to obtain an advertisement in response message 755 that will be displayed on web browser 756. (Note that the ad selector 725 will record that the advertisement was served in advertisement activity log 728.)

The virtual world client 766 will be handled in a generally similar fashion but with some differences inherent in the specific client application. The virtual world client 766 may indicate that the user's avatar has entered a new room with request 762. The virtual world server 735 will consult the virtual world database 737 to determine the surroundings for the user's avatar. The virtual world server 735 will then respond to the virtual world client 766 with information about the avatar's new surroundings. The response 763 may contain the actual data for rendering the avatar's surrounding or the response may contain a pointer to cached surroundings information already stored on computer system 761. If the new location for the user's avatar includes a poster of an advertisement, the response 763 may also instruct the virtual world client 766 to obtain an advertisement image from unified Internet advertisement service 720. Thus, virtual world client 766 will make a request to image server 724 at the unified Internet advertisement service 720 for an advertisement image. Image server will then respond with an advertisement image along 765 that virtual world client 766 can render on advertisement poster. Image server 724 will record that a virtual world advertisement was served in the advertisement activity log 728.

Unified Internet Advertising Tracking

In the example set forth in FIG. 7, there are two separate computer systems 751 and 761 that are illustrated accessing the unified advertisement service 720 individually with web browser client 756 and virtual world client 766, respectively. However, both web browser client 756 and virtual world client 766 may reside on the same computer system. Thus, the user of such a computer may receive advertisements for different application usages from the same unified advertisement service 720. In this manner, the advertisement tracking ability for different application platforms can be unified.

For example, a user may first see an advertisement for a particular company in a virtual world. The user may then later see another advertisement for the same company when later browsing the web. If the user clicks on that web advertisement and thus goes to the web site of that company, that click-through will also be recorded. Thus, advertisement tracking across multiple platforms can be tracked with the unified advertisement service 720.

Adding Additional Applications to the Unified Internet Advertising Systems

Figure 8:
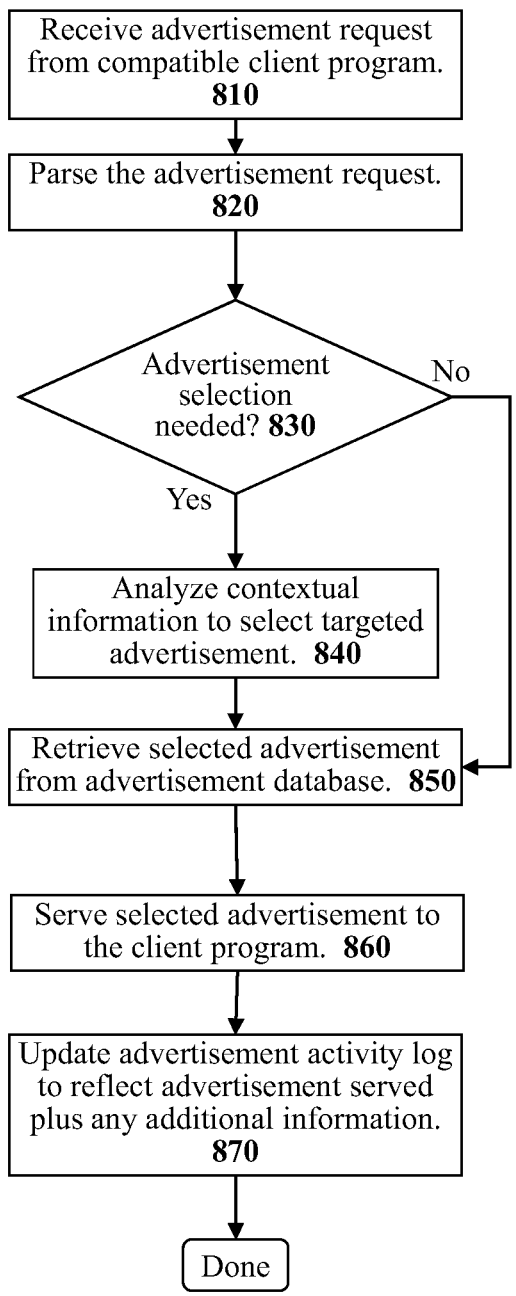
FIG. 8 illustrates a flow chart describing the operation of a generic server front-end for the unified Internet advertisement service.

The virtual world client 766 example set forth in FIG. 7 represents only one of countless possible client Internet applications that may be configured to operate with the unified Internet advertisement service 720. Additional client applications may be added to the system in order to use the existing advertising service front-ends such as the ad selector 725 and image server 724. Alternatively, new applications may use their own server front-ends such as other media server 729. To describe the general procedure for inter-operating with the unified Internet advertisement service 720, a high-level flow diagram is presented in FIG. 8 that describes the operation of a generic server front-end for the unified Internet advertisement service 720.

Initially, an advertisement request is received from a compatible client program at stage 810. Note that the advertisement request may be very different for each type of client program. Some requests will be for images to display, some requests will require the system to select an advertisement, and some requests may simply provide information for the server to log. The request is then parsed by the server front-end (such as other media server 729) at stage 820. The parsing extracts the information needed from the request. If the request from the client program is not properly formatted, then the server front-end may discard the request or respond with an error message to the client system. The requests may be encrypted and/or digitally signed such that unauthorized programs cannot make advertisement requests to the Internet advertisement service.

Next, at stage 830, the server front-end determines if the advertisement request requires the server front-end to make an advertisement selection. When the server front-end must make an advertisement selection, the server front-end uses all the information extracted from the advertisement request message to make the best possible advertisement selection for the particular context. The advertisement request message may include all sorts of information to help make a good advertisement selection such as demographic information, surrounding context, the type of application making the advertisement request, etc. Even when an advertisement request does not explicitly provide context information, the advertisement request may implicitly contain information that may be used to select an advertisement. For example, the Internet Protocol (IP) address from the advertisement requestor can be mapped to a specific geographic area such that an advertisement most appropriate for that particular geographic area may be selected. Once an advertisement is selected, the Internet advertisement service system proceeds to stage 850.

At stage 850, a selected advertisement (or other requested information) is retrieved from the advertisement database. This selected item may have been explicitly requested in the received request or it may have been selected by the server front-end at step 840. The server front-end then serves the selected advertisement (or other information) to the requestor at step 860. Note that steps 850 and 860 need not be performed for advertisement requests that were made by client programs that were only reporting an advertisement impression. (The advertisement may have been cached by client program such that no advertisement needed to be served to the client program.)

At step 870, the server front-end then updates the advertisement activity log. The server front-end stores relevant information into the advertisement activity log such as which advertisement was served, when the advertisement was served, any identification information that was associated with the requestor, etc.

Web Hosting in Exchange for Tracking Information

The costs of running an Internet publication include all of the costs associated with actually hosting the Internet publication online. For example, referring back to FIG. 7, the Internet publisher 710 must pay for several information technology costs. The Internet publisher 710 must pay for the disk space and database to store the web site data 717. The Internet publisher 710 must also pay for the physical web server 715 that handles web site requests. The Internet publisher 710 must also pay an Internet service provider for the connection 718 to the Internet 700. All of this information technology infrastructure must be created and maintained by information technology staff.

Of the various costs of hosting an Internet web site one of the most expensive portions is the connection to Internet. Referring to FIG. 7, the cost of the connection 718 to the Internet 700 will depend on how much data carrying capacity (bandwidth) the connection 718 has. The text of a web site generally uses very little capacity. But images, sounds, and especially video use much larger amounts of bandwidth.

In order to reduce costs for an Internet publisher, a service (such as unified Internet advertisement service 720) may offer to host various images on behalf of an Internet publisher. Specifically, images related to identifiable products or services may be hosted for free since the hosting service may be able to sell the tracking information to the vendors of those identifiable products or services. For example, if automobile web site reviews a particular car and the web site review includes images of the reviewed car then a service (unified Internet advertisement service 720) may host the images for that Internet publisher for free (or at reduced cost) in exchange for the ability to track the display of those images. The manufacturer of that automobile may then request that the unified Internet advertisement service 720 serve additional advertisements for that automobile for the Internet users that read that particular automobile review. The unified Internet advertisement service 720 will be able to do this since the unified Internet advertisement service 720 will have recorded identification information from the various client systems that requested the images associated with the automobile review.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A processor-implemented method, comprising:
   identifying, by a messaging program executing on a processor of a message delivery server, a message in a request that is made by a client messaging application on a messaging client by a user, wherein identifying further includes identifying that message includes external content that is to be vended with the message when the message is delivered to the messaging client;
   contacting, by the messaging program, a message analysis application executing on a different processor of a different server with information relevant to the message being requested by the client messaging application, wherein the information includes a unique identifier for the message for tracking by the message analysis application;
   receiving, by the messaging program an analysis message having special information that specifies how the message is to be processed based on the contacting;
   authenticating, by the messaging program, the message based on a portion of special information;
   acquiring, by the messaging program, the external content that is external to both the message and the client messaging application, the external content linked with at least a portion of the message;
   providing, by the messaging program, the message to the mail delivery server for delivery to the messaging client and the client messaging application to satisfy the request;
   integrating, by the messaging program, a presentation of the external content based on selective actions taken by the user for viewing the message from the client messaging application on the messaging client unless the message was unable to be authenticated and when the message was unable to be authenticated quarantining the message to a quarantine folder and when the message was authenticated providing an authentication image with the message for viewing by the user within the client messaging application on the messaging client; and
   providing, by the messaging program, tracking information to an external service that supplied the external content.

2. The method of claim 1 further comprising, recording, by the messaging program, the tracking information as a log having information for one or more of:
   a service identifier for the external service from which the external content was acquired, a user identifier for the user receiving the message, a message identifier for the message, a content identifier for the external content, and a sender identifier for an original sender of the message.

3. The method of claim 2, wherein recording further includes setting, by the messaging program, the log as a cookie on the messaging client of the user.

4. The method of claim 2, wherein recording further includes supplying the log to the external service to track the external content vending to the message.

5. The method of claim 1, wherein identifying further includes consulting the external service with a message identifier for the message to identify the message for having the external content vended to the message.

6. The method of claim 1, wherein acquiring further includes obtaining the external content or a reference to the external content from the external service, where the external content is an advertisement.

7. The method of claim 1, wherein integrating further includes presenting portions of the external content based on particular actions taken by the user with respect to the message within the client messaging application on the messaging client.

8. A processor-implemented method, comprising:
  detecting, by a messaging program executing on a processor of a message delivery server, an action taken by a user with respect to a portion of a message indicating that the user is attempting to view the message from a client messaging application on a messaging client;
  contacting, by the messaging program, a message analysis application executing on a different processor of a different server with information relevant to the message being requested by the client messaging application, wherein the information includes a unique identifier for the message for tracking by the message analysis application;
  receiving, by the messaging program an analysis message having special information that specifies how the message is to be processed based on the contacting;
  authenticating, by the messaging program, the message based on a portion of special information;
  quarantining, by the messaging program, the message in a quarantine folder when the message is unable to be authenticated;
  providing, by the messaging program, the message to the mail delivery server for delivery to the messaging client and the client messaging application to satisfy the action;
  combining, by the messaging program, the external content to present with the portion of the message based on the action taken by the user, the external content acquired from an external and existing service and permitting the message for viewing by the user within the client messaging application on the messaging client along with an authentication image when the message is authenticated; and
  facilitating, by the messaging program, the tracking of the external content combined with the portion of the message for the external and existing advertising service.

9. The method of claim 8 further comprising:
  detecting, by the messaging program, a subsequent action taken by the user:
  to delete the message or to classify the message as spam; and
  reporting, by the messaging program, the subsequent action taken by the user to the external and existing service.

10. The method of claim 8 further comprising, changing, by the messaging program, how the external content is combined with different portions of the message and what aspects of the external content are presented with those different portions based on subsequent actions taken by the user with respect to the message.

11. The method of claim 8, wherein detecting further includes recognizing the message as a particular message that is to have the external content based on one or more of:
  identifying attributes of the message and consulting with the external and existing service.

12. The method of claim 8, wherein detecting further includes recognizing the action as focus being placed over the portion of the message while the user views the message in a list view of the client messaging application on the messaging client.

13. The method of claim 8, wherein combining further includes generating a popup view for the message that includes additional external content and operations for the user to perform within the popup view, the popup view not originally part of the client messaging application on the messaging client.

14. The method of claim 8, wherein combining further includes integrating different external content acquired from the external and existing service based on a response action taken by the user on the external content combined with the portion of the message.

15. A processor-implemented method, comprising:
  monitoring, by a messaging program executing on a processor of a message delivery server, events occurring in a client application of a user on a messaging client;
  identifying, by the messaging program, a predefined event indicating the client application is making a request to view a message on the messaging client;
  consulting, by the messaging program, an external service with identifying information for the message, the predefined event, the client application, the messaging client, and the user;
  receiving, by the messaging program an analysis message having special information that specifies how the message is to be processed based on the contacting;
  authenticating, by the messaging program, the message based on a portion of special information;
  quarantining, by the messaging program, the message in a quarantine folder when the message is unable to be authenticated;
  acquiring, by the messaging program, advertising content from the external service that was customized by the external service for the predefined event, the client application, the messaging client, and the user, and integrating an authentication image with presentation of the message within the client application on the messaging client when the message was authenticated;
  providing, by the messaging program, the message to the mail delivery server for delivery to the messaging client and the client messaging application responsive to the predefined event; and
  instructing, by the messaging program, the client application on the messaging client to integrate the advertising content into portions of presentations occurring within the client application on the messaging client for consumption by the user.

16. The method of claim 15, wherein monitoring further includes monitoring events for a client application associated with one or more of:
  a client messaging application, a client streaming video application, and a client game application.

17. The method of claim 15, wherein consulting further includes providing a context for the predefined event and/or a profile for the user to the external service to use in customizing the advertising content for the user.

18. The method of claim 17, wherein providing further includes analyzing cookies on a client of the user to generate the profile.

19. The method of claim 15, wherein acquiring further includes caching the advertising content within the messaging client for the client application to reuse when the predefined event is re-encountered by the client application.

20. The method of claim 15 further comprising:
  consulting, by the messaging program, the external service a second time when the predefined event is detected a second time for the user within the client application;
  obtaining, by the processor, different advertising content in response to a second occurrence of the predefined event; and
  instructing, by the processor, the client application on the messaging client to integrate the different advertising content into the portions of the presentations occurring within the client application on the messaging client for consumption by the user.

* * * * *